United States Patent [19]

Kogan

[11] 4,342,598
[45] Aug. 3, 1982

[54] METHOD AND APPARATUS FOR MANUFACTURING CEMENT CLINKER

[76] Inventor: Naum P. Kogan, ulitsa Akademka Pavlova, 140, kv. 89, Kharkov, U.S.S.R.

[21] Appl. No.: 194,141

[22] Filed: Oct. 6, 1980

[51] Int. Cl.$^3$ .............................................. C04B 7/02
[52] U.S. Cl. ................................ 106/100; 106/103; 432/106
[58] Field of Search ............... 106/100, 103; 432/14, 432/15, 105, 106

[56] References Cited

U.S. PATENT DOCUMENTS 4,187,071  2/1980  Brachthauser et al. ............ 106/100

Primary Examiner—James Poer
Attorney, Agent, or Firm—McAulay, Fields, Fisher, Goldstein & Nissen

[57] ABSTRACT

Method of manufacturing cement clinker comprises preheating finely divided cement raw material, injecting this raw material by an air flow through the charge end of a rotary kiln, and decarbonizing suspension of the said raw material by a counterflow of the combustion gases resulting from burning fuel at the discharge end of the kiln. Thereafter, the decarbonized material is withdrawn by the peripheral portion of the combustion gas flow through said charge end of the kiln, separated from the gaseous combustion products, and delivered back into said kiln for being burned in a stirred bed into cement clinker.

Apparatus for realizing this method comprises a rotary kiln having a charge and a discharge ends, an ejectro coaxially introduced into said rotary kiln through the charge end thereof, a cyclone heat exchanger communicated with said ejector, a separator communicated with the charge end of said kiln, adapted for separating the decarbonized material from the combustion gases and having an inclined chute introduced into the charge end of said rotary kiln.

11 Claims, 4 Drawing Figures

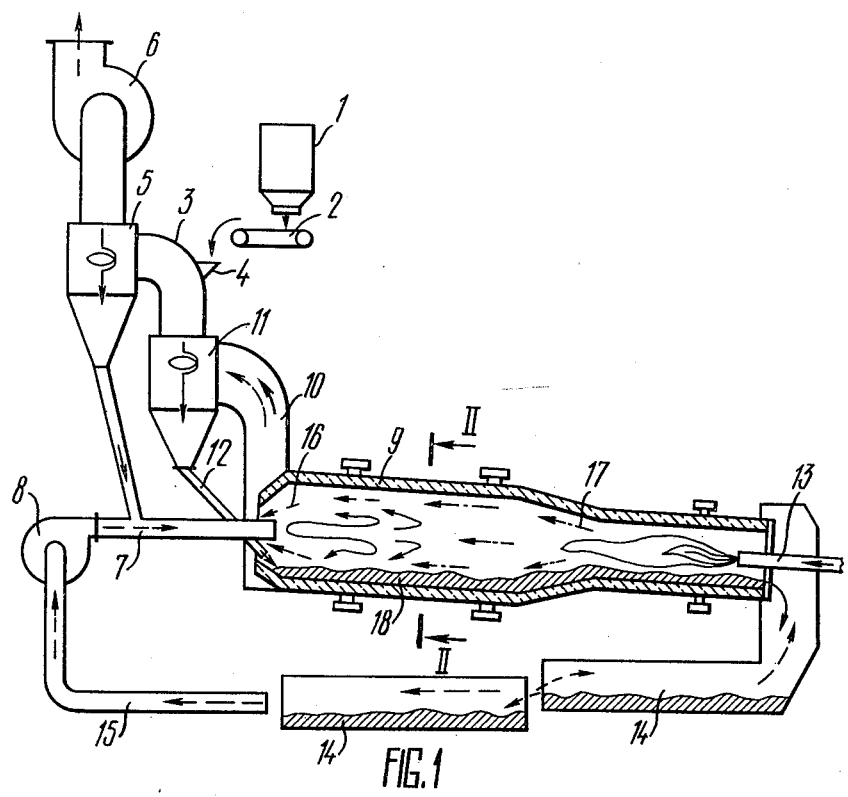
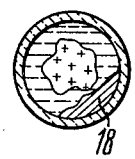

METHOD AND APPARATUS FOR MANUFACTURING CEMENT CLINKER

BACKGROUND OF THE INVENTION

1. Field of the Invention

The present invention is concerned with a production process and apparatus for producing cement clinker, and may be used in the industry of building materials.

2. Prior Art

It is a common knowledge that the cost of the cement depends to a great extent on the specific consumption of energy consumed in the production of the cement clinker. It is also a well known fact that the production of cement clinker is associated with a considerable non-productive consumption of heat and, hence, with an extra consumption of fuel. Many attempts have been made to reduce a non-productive consumption of fuel by improving equipment and production processes. These attempts, however, led, in general, to more complex equipment having a greater weight and size, and the gains obtained due to a higher factor of the utilization of energy are brought to nothing by a higher cost of the equipment. A great number of patents granted in the last 10–15 years for improvements in the above apparatus and methods shows that this problem remains to be adequately solved yet.

A conventional process of producing cement clinker (cf., for example, R. Fogel, Silikattechnik No. 9, 1966) comprises preheating powdered cement raw material and treating the same in a rotary kiln wherein this material is decarbonized in a stirred bed and burned into clinker as it is moving towards the discharge side of the kiln.

It is clear that the particles of the material being burned, which are on/or close to the surface of the stirred bed are exposed to the most intensive heating, and therefore heating the layer of material through its whole depth requires a considerable amount of energy, thereby causing increased consumption of fuel. The combustion gases discharged from the kiln have a temperature in the order of 900°–1200° C., and therefore only a relatively small portion of their heat can be utilized. In addition, the intensity of the decarbonization within a stirred bed is low, which affects the efficiency of the apparatus.

It has been tried to overcome this disadvantage by separating the process of decarbonization from burning, which has been embodied in a method of producing cement clinker (cf. French patent specification No. 2,235,890), wherein powdered cement raw material is preheated to a temperature of 800°–900° C. and then introduced into a decarbonizer in which powdered cement raw material is decarbonized in a suspended state by burning a portion of the fuel. The other portion of the fuel is burned within the kiln into which is also introduced the decarbonized material. As this material moves from the charge to the discharge end of the kiln it is burned in a stirred bed into granules. In carrying out this method 40–50% of the fuel is burned in the decarbonizer, while the rest thereof is fed into the kiln. Preheating cement raw material powder is effected by the combustion gases withdrawn from the decarbonizer and the kiln. Decarbonization of the material being in a suspended state proceeds far much intensively than in a stirred bed, and therefore the efficiency of the apparatus for carrying out this method is considerably higher. However, using the above method is associated with higher losses of heat, caused by the heat radiation through the walls of the decarbonizer. In addition, separately heating the powdered raw material for the purpose of decarbonization, and burning the same requires more fuel, and leads to the increase of the size, weight, and hence cost of the equipment.

There is also known an apparatus wherein the above disadvantage has been mitigated by combining the decarbonization and burning in one process (cf. FRG Pat. No. 2,061,980). According to this method the powdered cement raw material is preheated to a temperature of 800°–900°, decarbonized in a suspended state and burned. Decarbonizing powdered cement raw material is done by injecting the latter in an air flow into the kiln through the charge end thereof. The fuel is fed simultaneously through the same end. The burning fuel forms a flow of combustion gases. Burning the carbonized material into cement clinker is also effected in a suspended state. After being discharged from the kiln the suspension of the cement clinker thus obtained is separated into a solid and a gaseous phases. Being separated the combustion gases are further used for preheating cement raw material.

An apparatus for carrying out the above method comprisses cyclone heat exchangers connected in series with the charge end of a rotary kiln. Coaxially introduced into the kiln through the charge end thereof is an ejector connecting the said cyclone heat exchangers with the inner space of the kiln. The ejector includes a burner, and is connected with a source of air. At the discharge end of the kiln is disposed a separator-precipitator made in the form of a cyclone precipitator communicated with the cyclone heat exchanger for partially utilizing the heat of combustion gases.

Elimination of the separate decarbonizer permits the heat losses caused by radiation to be decreased, and the size and weight of the apparatus to be reduced.

Nevertheless, the above method have not found a wide application for a number of reasons. Thus, burning the decarbonized material being in suspension does not provide for a full burning of the whole mass of the material being treated, thereby affecting the quality of the resulting cement clinker. To some extent this could be remedied by increasing the amount of fuel being burned. However, this would inevitably entail a considerable increase in the temperature of the clinker within the precipitator. As a result, a layer of clinker is rapidly deposited on the walls of the precipitator, which makes it necessary to periodically stop the operation for cleaning. In addition, for the utilization of heat of the gaseous combustion products having a temperature in the order of 1400° C. the apparatus must be provided with a multi-stage system of heat exchangers at least five cyclone heat exchangers. The more heat exchangers, the larger surface of heat transfer, and hence higher irrepairable losses of heat. At the same time the presence of these cyclone heat exchangers increases a flow resistance and required a more powerful exhaust fan.

Increasing the length of the rotary kiln in order to prolong the time of burning is not expedient from the economical point of view.

SUMMARY OF THE INVENTION

The principal object of the invention is to provide a more economical method for producing cement clinker, wherein the decarbonization and burning the decarbonized material are combined.

Another object of the invention is to reduce the amount of heat losses of the combustion gases.

Still another object of the invention is to reduce consumption of fuel.

Yet another object of the invention is to reduce a flow resistance in the heat utilization system.

A further object of the invention is to provide a method permitting the time of burning the decarbonized material to be considerably prolonged, with the finely divided raw material being decarbonized in a suspended state.

Still further object of the invention is to reduce the production cost of cement clinker.

One of the objects of the invention in the provision of a process permitting the utilization of unground metallurgical slag for the production of cement klinker.

Another not less important object of the invention is to provide an apparatus for producing cement clinker, wherein the decarbonization of finely divided cement raw material in a suspended state and burning thereof into cement clinker within a rotary kiln are combined, with the time of burning prolonged and the efficiency of burning improved, without increasing the length of the kiln.

An additional object of the invention is to provide an apparatus permitting utilization of unground metallurgical slag for the production of cement clinker.

These and other objects of the invention are achieved by that in a method of producing cement clinker, comprising preheating finely divided cement raw material, injecting this raw material in an air flow into a rotary kiln through a charge end thereof, decarbonizing the same in a suspended state by burning fuel within the kiln, and burning the thus decarbonized material by combustion gases, according to the invention decarbonizing finely divided cement raw material being in suspension is effected in a counterflow of the combustion gases resulting from burning the fuel at the discharge end of the kiln, whereafter the material thus decarbonized is carried by the peripheral portion of the said combustion gas flow from the klin through the charge end thereof, separated from the combustion products, and then fed again into the kiln for burning the decarbonized material in a stirred bed into cement clinker.

Decarbonizing cement raw material in a counterflow of the combustion gases resulting from burning the fuel at the discharge end of the kiln results in that a considerable amount of the heat is usfully consumed, while the flow velocity of the said gases is reduced. As a result the temperature of combustion gases outflowing from the kiln through the charge end thereof is not higher than 650° C. In this case one or two cyclone heat exchanger are sufficient for this heat to be utilized, which permits a specific consumption of heat for the production of cement clinker to be considerably decreased. It is to be noted that the gaseous combustion products do not leave, at all the kiln through the discharge end thereof, and the temperature of the cement clinker thus produced is 1100° C. At this temperature the clinker is not adhesive and therefore does not tend to stick to the walls of the cooler, which is also favoured by the fact that the clinker is produced in the form of granules. It is also advantageous that burning the decarbonized material into cement clinker is effected in a stirred bed, which provides for a sufficient holding of the material being treated so that there is no need to raise the temperature to 1400° C. This permits consumption of fuel to be brought down, the quality of the clinker produced to be improved, and the production cost to be lowered. Production of the cement clinker in the form of granules rules out the necessity of using additional cleaning devices at the discharge end of the kiln, and there is no need to stop the operation for cleaning the cooler.

Finely divided cement raw material is preheated to a temperature ranging from 400° to 600° C. by gaseous combustion products separated from the decarbonized material. The method of the invention allows that the waste heat energy to be practically fully utilized.

In the preferred embodiment the preheated raw material is injected into the kiln together with a portion of the fuel to be burned so that the decarbonization of cement raw material is effected in counterflows of combustion gases.

The above embodiment of the invention allows the efficiency of the production process to be considerably raised without rising of the temperature of the combustion gases discharged through the charge end of the kiln.

The best results are achieved by burning 20–80% of fuel at the discharge end of the kiln, and the rest at the charge end thereof.

Production cost can be considerably cut down by introducing metallurgical slag into the suspension of the decarbonized material withdrawn from the kiln, whereafter the solid phase is separated and fed again into the kiln for being burned into cement clinker in a stirred bed.

As a result of evaporation of water contained in the particles of slag they grow smaller and are caked with the decarbonized material. The metallurgical slag is known to be a cheap and well calcined material containing oxides of various metals. The presence of calcined slag in the decarbonized material leads to that less heat is needed for burning the said decarbonized material into clinker.

It is expedient that metallurgical slag be introduced in an amount of from 0.02 to 1.35 tons per one ton of the decarbonized material per hour.

Good quality of the resulting cement clinker and a minimal consumption of energy are attained by adding a slag having a relative humidity of 1.5–12%, acidity 0.2–1.4, and particle size from 0.5 to 40 mm.

The object of the invention is attained in that in an apparatur for carrying out the method, comprising a cyclone heat exchangers for preheating finely divided cement raw material, an ejector communicated with said cyclone heat exchanger and with an air source, a rotary kiln through the charge end of which is introduced the said ejector, and a burner introduced into the said rotary kiln, according to the invention the burner is introduced into the kiln through the discharge end thereof, the charge end of the kiln being connected with an exhaust fan through a separator fitted with an inclined chute for the separated decarbonized material to pass back into the kiln. The presence of the burner at the charge end of the kiln allows decarbonizing raw material in a counterflow of combustion gases, and thereby to considerably decrease specific consumption of heat, whereas the presence of the exhaust fan and separator provides for withdrawal of the decarbonized material, separation thereof from combustion gases and its burning in a stirred bed.

It is advisable to communicate the separator with the exhaust fan through the cyclon heat exchanger for preheating powdered raw material, which provides for a fooler utilization of heat.

More economic is a modification of the apparatus wherein there is provided an additional burner installed in the ejector at the charge end of the kiln.

It is also advisable to install at the inlet of the separator a feed hopper for feeding metallurgical slag. This modification of the apparatus permits using metallurgical slag without its being preliminarly ground.

BRIEF DESCRIPTION OF THE DRAWINGS

The invention will now be explained in greater detail with reference to embodiments thereof which are represented in the accompanying drawings, wherein:

FIG. 1 schematically represents an apparatus for carring out the method of the invention;

FIG. 2 is a cross section of a rotary kiln, taken along line II—II in FIG. 1, wherein symbols /+/ and /−/ denote the direction of gas flow;

DETAILED DESCRIPTION OF THE INVENTION

Figure 3:
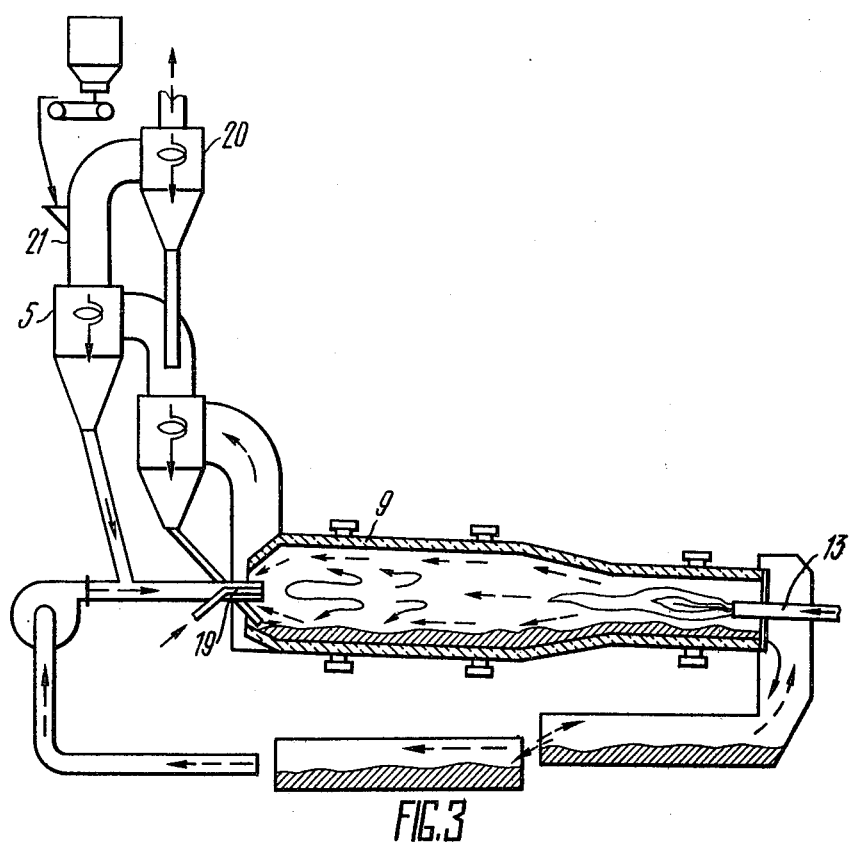
FIG. 3 is a preferred modification of the apparatus of the invention, wherein there is provided an additional burner located in the ejector.

The proposed method of the invention is realized in the following way. Finely divided cement raw material is preheated to a temperature of from 400° to 600° C. and then injected by an air flow into a rotary kiln through the charge end thereof, while at the discharge end of the kiln fuel is burned to produce a counterflow of combustion gases.

Decarbonizing the raw material being in a suspended state in the said air flow is effected in a counterflow of combustion gases, in which case the resulting decarbonized material is entrained by the peripheral portion of the said flow and carried thereby from the kiln through the charge end thereof. Thereafter the suspension of the decarbonized material thus withdrawn from the kiln is separated from combustion gases. The combustion gases, now clean, are used for preheating raw material, while the separated decarbonized material is delivered back into the kiln, wherein said material is burned in a stirred bed into cement clinker. The resulting product in the form of granules is cooled.

In a preferred embodiment of the invention the preheated raw material is injected into the kiln together with a portion of the fuel used. Burning fuel at the opposite ends of the kiln produces counter-flows of combustion gases in which counterflaws the raw material is decarbonized. To prevent the formation of a gas lock at the charge end of the kiln there is caused exhaustion. Further, the operation proceeds as described above. In the case of this modification of the method, from 20 to 80% of fuel is burned at the discharge end of the kiln, and the rest at the charge end thereof.

According to another modification of the method a certain amount of metallurgical slag is introduced into the suspension of the decarbonized material withdrawn from the kiln. The slag particles entrained by the hot combustion gases are fractured by evaporating of the moisture contained in them. Thereafter a solid phase containing decarbonized material and metallurgical slag is separated and fed again into the kiln for being burned in a stirred bed into clinker. The metallurgical slag is continuously introduced into the decarbonized material in an amount of from 0.02 to 1.35 tons per one ton of the decarbonized material per hour. The best results are achieved in the case of using a slag having relative humidity of from 1.5 to 12%, acidity from 0.2 to 1.4, and particle size from 0.5 to 40 mm.

Specific consumption of heat in this case is 750 kkal per 1 kg of clinker produced. In the case of the prior art method wherein the decarbonization and burning are effected in the direct flow, specific consumption of heat per one kg of clinker produced constitutes 1100 kkal, whereas with the use of metallurgical slag in accordance with the proposed method, specific consumption of heat can be reduced to 580 kkal per 1 kg of the resulting clinker.

An apparatus for carrying out the proposed method of the invention (FIG. 1) comprises a feed hopper 1 mounted over a dosing conveyer 2. Under the dosing conveyor 2, in a connecting pipe 3, there is provided a port 4. The connecting pipe 3 is communicated with the inlet of a cyclone heat exchanger 5, which, in its turn, is communicated with an exhaust fan and an ejector 7. The ejector 7 is connected with an air source 8 (in this case a centrifugal pump) and coaxially introduced into a rotary kiln through the charge end thereof. The charge end of the rotary kiln 9 communicates, through a connecting pipe 10, with a separator 11 fitted with an inclined chute 12 which is introduced into the charge end of the kiln. Introduced into the kiln through the discharge end thereof is a burner 13. At the discharge end of the kiln is mounted a cooler 14 communicated, through a pipe 15, with an air source (in this case a centrifugal pump). Shown in FIG. 1 by arrows is the direction of flow of the decarbonized material suspension, and by dotted arrows—flow paths of combustion gases. For better understanding in the lower portion of the kiln is shown a layer the decarbonized material being burned. Gas flows with respect to the cross section of the kiln (FIG. 2) are denoted by symbols (+) and (−).

The preferred embodiment of the invention is shown in FIG. 3. This modification of the apparatus of the invention is in general similar to that described above, except for that it is provided with another burner 19. To ensure a better utilization of heat, this modification is provided with an additional cyclon heat exchanger 20 communicated through a connecting pipe 21 with the cyclone heat exchanger 5, in which case a charging port 4 is located in the connecting pipe 21.

Figure 4:
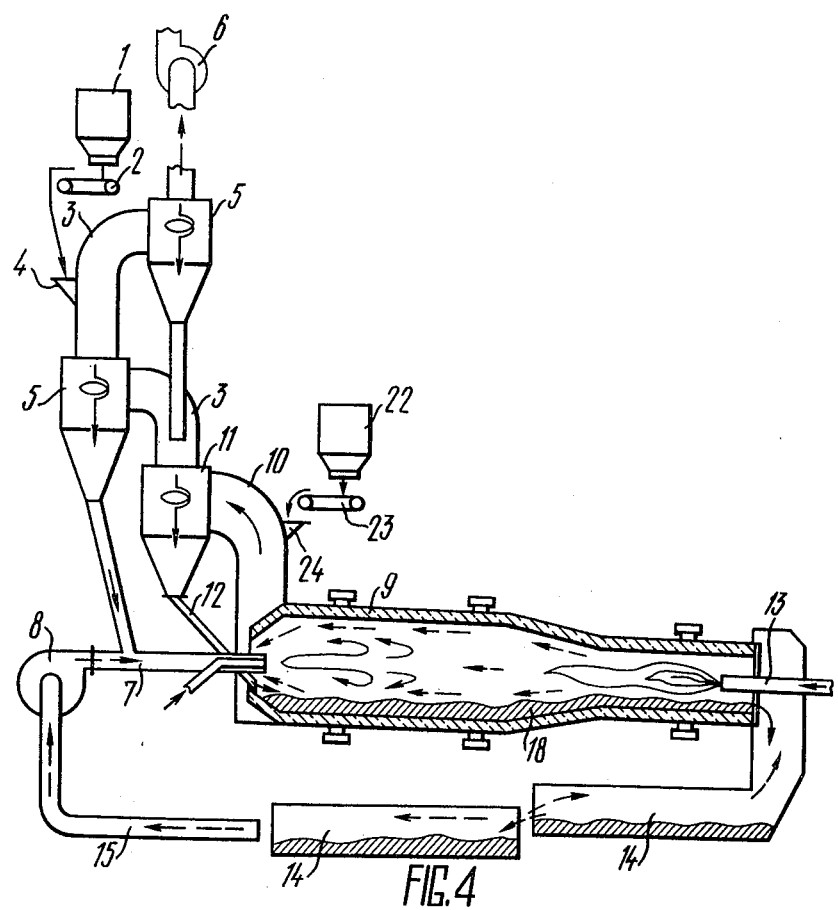
FIG. 4 represents a modification of the apparatus of the invention adapted for utilizing metallurgical slag for the production of cement clinker.

Shown in FIG. 4 is a modification of the apparatus similar to that in FIG. 3. This modification of the apparatus is provided with a feed hopper 22 disposed over the dosing conveyer 23 and adapted for feeding unground metallurgical slag. The pulley of the dosing conveyor 23 is disposed over a charging port 24 of the connecting pipe 10.

The apparatus of the invention operates as follows.

Finely divided cement raw material is delivered from the feed hopper 1 onto the dosing conveyer 2, and through the port 4 is poured into the connecting pipe 3 wherefrom it is continuously passed into the cyclon heat exchanger 5. In the heat exchanger 5 this raw material is preheated to a temperature of 400°–600° C. by the combustion gases withdrawn from the kiln 9 by the exhaust fan 6. The thus preheated raw material is transferred from the heat exchanger 5 into the ejector 7 whereinto air is forced from the air source 8. Entrained by the air flow the finely divided cement raw material is injected into the kiln 9 through its charge end. Combustion gases resulting from burning fuel in the burner 13 at the discharge end of the kiln 9 flow towards the charge end thereof. Finely divided raw material getting into the counterflow of combustion gases is decarbonized absorbing a great amount of heat of the combustion gases the temperature of which is lowered, as a result, to 650° C. The peripheral portion of the gas flow (in FIG. 1 is shown by dotted arrows, and in FIG. 2—by symbols (−)) entrains and carries the decarbonized material through the charge end of the kiln 9, which is favoured by the exhaustion action caused by the exhaust fan 6. The suspension of the decarbonized material is passed through the connecting pipe 10 into the separator 11 wherein this suspension is separated into a solid and a gaseous phases. Thereafter, the combustion gases are passed through the connecting pipe 3 into the cyclone heat exchanger 5 for preheating the raw material, which is fed to the said heat exchanger through the port 4 by the said combustion gases. The decarbonized material settled in the separator 11 passes on the inclined chute 12 into the lower part of the kiln. As the decarbonized material moves in a stirred bed from the charge end of the kiln 9 to the discharge end thereof it is burned into granules. The resulting granulated clinker is discharged from the kiln into the coller 14. Air flowing through the air conduit 15 in the coller 14 is passed to the source 8. Thus the heat of the clinker being cooled is utilized in the cooler 14.

The modification of the apparatus shown in FIG. 3 operates in a similar manner, except for that preheating cement raw material is effected in two stages using two cyclone heat exchangers 20 and 5. Apart from this a part of the fuel is burned in the burner 19 at the charge end of the kiln, in which case the decarbonization of the raw material is effected in counterflows of the combustion gases, with 20-80% of the fuel being burned in the burner 13, and the rest in the burner 19.

The modification of the apparatus shown in FIG. 4 operates in a similar manner as shown in FIG. 3, except for that from the feed hopper 22 into the charging port 24 is continuously fed by the dosing conveyor 23 unground slag the particles of which being entrained by the hot combustion gas flow are fractured by the evaporating moisture contained therein. The slag particles, now smaller in size are mixed with the decarbonized material within the connecting pipe 10 and settled in the separator 11. The resulting mixture of the decarbonized material with slag flows on the inclined chute 12 into the kiln 9 to be burned into cement clinker in a stirred bed 18.

Below are given specific examples of how the method of the invention is carried out.

EXAMPLE 1

Cement clinker was produced as follows. Finely divided cement raw material containing 79.8% by weight of limestone, 19.0% by weight of clay, and 1.2% by weight of pyrite cinters, was continuously charged into a cyclone heat exchanger and preheated to a temperature of 500° C., with the rate of charging being 195 tons per hour. The combustion gases resulting from burning fuel (natural gas), separated from the decarbonized material, were used for preheating the said raw material. This raw material thus preheated was injected by an air flow into a rotary kiln through the charge end thereof, the rate of air flow being 12,800 cu/m per hour. Decarbonizing the raw material was effected in a counterflow of the combustion gases resulting from burning the fuel at the discharge end of the kiln, the amount of fuel being burned at the discharge end constituting 100% by weight. Decarbonization was effected at a temperature of 750° C. and lasted 1 sec. In the course of the decarbonization, the suspension of the already decarbonized material was entrained by the peripheral portion of the flow of the combustion gases and carried out thereby from the rotary kiln through the charge end thereof. From the resulting suspension thus obtained was separated dispersed decarbonized material which was delivered into the kiln for burning in a stirred bed. After separation, the combustion gases were used, as indicated above, for preheating cement raw material.

In the course of burning, the decarbonized material was gradually heated to a temperature of 1450° C. and caked into granules. The clinker granules thus obtained were then cooled for 20-30 min in an air flow.

Measuring and processing production conditions, consumption of fuel, and rate of the heat radiation showed that specific heat consumption was 750 kkal per 1 kg of cement clinker. Thus, in comparison with the known process, wherein decarbonizing and burning cement raw material are effected in a direct flow of the combustion gases, the energy consumption lowered by 10%. It has been also established that the proposed process requires a more compact rotary kiln without a system of cyclones at the discharge end, and hence less costly. It has to be noted, for the purpose of comparison, that the specific consumption of fuel of the most modern apparatuses incorporating decarbonizers constitutes 780 kkal per 1 kg of cement clinker.

EXAMPLE 2

Cement clinker was produced in general as disclosed in Example 1. Finely divided cement raw material was preheated to 400° C., and the temperature of decarbonization was 730° C. Burning and cooling conditions were maintained as those in Example 1. It has been established that this modification of the process also decreases the specific consumption of fuel: by 10% as compared with the prior art, and by 5% as compared with apparatus incorporating a decarbonizer.

EXAMPLE 3

Cement clinker was produced in general as disclosed in Example 1. Finely divided cement raw material was preheated to 600° C., and the temperature of decarbonization was 760° C. Burning and cooling conditions were maintained as those in Example 1. It has been established that this modification of the process also reduces the specific consumption of fuel: by 10% as compared with the prior art, and by 5% as compared with apparatus incorporating a decarbonizer.

EXAMPLE 4 (NEGATIVE)

Cement clinker was produced generally in the same way as disclosed in Example 1, from identical raw materials and with the same burning and cooling conditions. The temnperature of preheating the raw material was 300° C., which is lower than the minimal one recommended in accordance with the invention. Decarbonization of the cement raw material was effected at a temperature of 650° C.

It has been established, as a result, that the specific consumption of fuel in this case was the same as in the case of apparatus provided with a decarbonizer (780°-800° C. kkal per 1 kg of cement clinker produced). At the same time preheating the cement ray material to the temperature of 300° C. does not permit full utilization of the heat of the gaseous combustion products, thereby causing a non-productive loss of heat.

EXAMPLE 5 (NEGATIVE)

Cement clinker was produced, generally, in the same way as disclosed in Example 1, from identical raw materials, and with the same burning and cooling conditions. The temperature of preheating the raw material was 700° C., which is higher than the maximal one recommended in accordance with the invention. Decarbonization of the raw material was effected at a temperature of 800° C.

It has been established as a result of repeated use of this embodiment that though the specific consumption of energy was lower, there appeared a number of disadvantages because of which the above modification of the process cannot be advised for commercial reasons. In particular, in most cases there was observed a partial fusion of material, softening of clinker and sticking thereof to the walls of the cooler.

EXAMPLE 6

In a preferred embodiment of the invention cement clinker was produced mainly as in the case disclosed in Example 1, except for that preheated raw material was injected into the kiln together with a portion of the fuel used, with 50% of this fuel burned at the case end of the kiln and the rest being burned at the discharge end thereof. Decarbonization conditions were as follows:

| consumption of air, cu m | 12300 |
| temperature, °C. | 850 |
| holding time, sec | 0.6 |

In the course of burning, the temperature of the decarbonized material was raised to 1450° C. Specific consumption of heat was 740 kkal per 1 kg of cement clinker, which is by $\beta\%$ lower than in Example 1.

EXAMPLE 7

Cement clinker was produced mainly in the same way as disclosed in Example 6, from identical raw material and with similar conditions of preheating and cooling, with except for that the amount of fuel burned at the charge end of the kiln constituted 80% by weight, and that burned at the discharge end was 20% by weight. Decarbonization lasted 0.8 sec and was effected at a temperature of 950° C. Specific consumption of heat per 1 kg of clinker was 10 kkal lower that in Example 1.

EXAMPLE 8

Cement clinker was produced mainly in the same way as disclosed in Example 6, from identical raw material and with the same conditions of preheating and cooling, with except for that the amount of fuel burned at the charge end of the charge end of the kiln constituted 20% by weight, whereas that of fuel burned at the discharge end was 80% weight percent. Decarbonization was effected at a temperature of 790° C. and lasted 0.5 sec. Specific consumption of heat per 1 kg of cement clinker produced was by 10 kkal lower than in Example 1.

EXAMPLE 9 (NEGATIVE)

Cement clinker was produced mainly in the same manner as disclosed in Example 6-8, but the amount of fuel burned at the charge end of the kiln was 90 weight percent, and that of fuel burned at the discharge end thereof constituted 10 weight percent. In this case the specific consumption of fuel per 1 kg of cement clinker produced was by 1 kg higher than in Example 1, which was caused by that the temperature of the combustion gases and decarbonized raw material being withdrawn through the charging end of the kiln was as high as 1000°-1100° C. Accordingly, heat losses also increased, which necessitated using additional cyclone heat exchangers, thereby increasing the production cost of clinker. At the same time, because of insufficient quantity of fuel used for burning the conditions thereof were not adequate.

EXAMPLE 10 (NEGATIVE)

Cement clinker was produced mainly in the same manner as disclosed in Examples 6-8, except for that the amount of fuel burned at the charge end of the kiln constituted 10% by weight, and at the discharge end (−) 90%. However, to realize this modification of the proposed method a costly special inner lining is needed for the kiln. In addition, with the above operating conditions the material at the discharge end turned to be overheated and became sticky.

EXAMPLE 11 (NEGATIVE)

According to another embodiment of the method cement clinker was produced mainly as disclosed in Example 6, except for that metallurgical slag was introduced into the suspension of the decarbonized material withdrawn from the kiln. Chemical composition of the slag used as follows, in percent by weight:

| calcium oxide | 47.14 |
| silicon oxide | 37.11 |
| aluminium oxide | 7.97 |
| ferric oxide | 0.86 |
| other oxides | balance |

The slag used had a relative humidity of 5%, and acidity 0.6. Average size of particles was 10 mm. The slag was continuously introduced in an amount of 0.4 t per 1 ton of the decarbonized material per 1 hour.

Decarbonization of cement raw material was effected under the following operating conditions;

| consumption of air, cu/m per hr | 12300 |
| temperature, °C. | 850 |
| holding time, sec | 0.6 |

In the course of burning the decarbonized material, the temperature thereof was raised to 1300° C.

As compared to the results obtained in Example 6 the cost of the cement clinker thus produced was lower by 30%, and the specific consumption of heat was 690 kkal per 1 kg of clinker. These results were obtained due to the introduction of slag and reduced consumption of fuel.

EXAMPLE 12

Cement clinker was produced with the use of slag mainly in the same manner as disclosed in Example 11, maintaining the same operating conditions for decarbonization, burning and cooling, except for that introduced into the suspension of the decarbonized material was waste slag resulting from the production of nickel, which slag containing the following ingradients, in % by weight:

| | |
|---|---|
| silicon oxide | 53.26 |
| calcium oxide | 20.24 |
| aluminium oxide | 9.06 |
| magnesium oxide | 6.7 |
| ferric oxide | 9.0 |
| other oxides | balance |

A relative humidity of the slag was 12%, its acidity—1.4, an average size of particles—40 mm. The slag was continuously introduced at a rate of 0.02 ton per hour per 1 ton of the decarbonized material. Specific consumption of fuel was 730 kkal per 1 kg of clinker, which was by 11% lower than in the case of the prior art method, and lower than in Exammple 1.

EXAMPLE 13

Cement clinker was produced with the use of slag maintainly in the same manner as disclosed in Example 11, maintaining the same operating conditions for decarbonization, burning and cooling, except for that introduced into the suspension of the decarbonized material was waste slag resulting from the production of electric furnace steel, which slag containing the following ingradiants, in % by weight:

| | |
|---|---|
| silicon oxide | 16.0 |
| calcium oxide | 56.7 |
| aluminium oxide | 1.5 |
| magnesium oxide | 1.8 |
| ferric oxide | 10.6 |
| other oxides | balance |

A relative humidity of the slag was 1.%%, its acidity—0.2, an average size of particles—0.5 mm. The slag was continuously introduced at a rate of 1.35 ton per hour per I ton of the decarbonized material. Specific consumption of fuel was 580 kkal per 1 kg of clinker, which was by 40% lower than in the case of the prior art method, and lower than in Example 1.

EXAMPLE 14 (NEGATIVE)

Cement clinker was produced mainly as disclosed in Example 11 with the use of waste iron slag whose chemical composition was the same as in Example 11.

A relative humidity of the slag being introduced, its acidity and an average size of particles where similar to those described in Example 11, except for that the slag was introduced with a rate of 1.5 per ton of the decarbonized material per hour. Specific consumption of heat was 540 kkal per 1 kg of clinker produced. Though the specific consumption of heat was lower in comparison with the prior art process, this modification of the proposed method is not advisable for economical reasons, since such amount of slag introduced results in a much lower saturation factor of clinker, thereby affecting quality of the resulting cement.

EXAMPLE 15 (NEGATIVE)

Cement clinker was produced mainly as disclosed in Example 11 with the use of waste iron whose chemical composition was the same as in Example 11.

A relative humidity of the slag being introduced, its acidity and an average size of particles were similar to those described in Example 11, except for that the slag was introduced with a rate of 0.01 ton per ton of secarbonized material per hour. A specific consumption of heat was 740 kkal per 1 kg of clinker produced. The results obtained show that introduction of such amount of slag does not practically influence either the specific consumption of heat, or production cost of clinker.

EXAMPLE 16 (NEGATIVE)

Cement clinker was produced in the similar manner using finely divided cement raw material and slag as disclosed in Example 11, except for that a relative humidity of the slag being added was 14%. Specific consumption of heat was 698 kkal per 1 kg of the clinker produced. However, using a slag with such a high humidity caused intensive explosion-like fracturing of the slag particles thereby affecting stability of the operation and causing cracks in the gas conduits and lining.

EXAMPLE 17 (NEGATIVE)

Cement clinker was produced mainly as in Example 11 with the use of the same raw material and slag, except for that the relative humidity of the slag being added was 1%. A specific consumption of heat constituted 686 kkal per 1 kg of the clinker produced. It has been established that such moisture content in the slag being introduced is not sufficient to cause a thermal fracture of the slag particles, and therefore the resulting cement clinker contained a considerable quantity of large particles of the slag.

EXAMPLE 18 (NEGATIVE)

Cement clinker was produced in the same way as disclosed in Example 11, except for that an average size of the slag particles was 50 mm. Specific consumption of heat constituted 690 kkal per 1 kg of the clinker produced. In this case the resulting clinker also contained, like in Example 17, a considerable quantity of large unbound particles of slag.

EXAMPLE 19 (NEGATIVE)

Cement clinker was produced as disclosed in Example 11, except for that an average size of the slag particles was 0.1 mm. Specific consumption of heat constituted 690 kkal per 1 kg of slag produced. In spite of the fact that the heat consumption was relatively low, this modification of the proposed method is not sufficiently efficient from the economical point of view, since to obtain this particle size a waste slag to be ground, which makes production cost unfavourable.

EXAMPLE 20 (NEGATIVE)

Cement clinker was produced in the same manner as disclosed in Example 11, except for that introduced into the decarbonized material was furnace slag whose acidity was 1.98 and which had the following chemical composition, in % by weight:

| | |
|---|---|
| silicon oxide | 55.3 |
| aluminium oxide | 25.0 |
| ferric oxide | 10.7 |
| calcium oxide | 3.4 |
| magnesium oxide | 1.23 |
| other oxides | balance. |

It has been observed as a result that burning the decarbonized material resulted in the formation of a stricky melt.

EXAMPLE 21 (negative)

Cement clinker was produced as in Example 11, except for that acidity of the slag introduced into the decarbonized material was 0.05. Such slag, however, is available in small quantities, and therefore cannot be used on a commercial scale.

EXAMPLE 22

Cement clinker was produced as follows. Finely divided cement raw material containing chalk, clay, ash, and pyrite cinders were continuously charged at a rate of 179 tons per hour to a cyclon heat exchanger, preheated to a temperature of 600° C., and then injected into a rotary kiln by air flow, with the rate of air consumption being 13.000 cu/m per hour. Coal dust used as a fuel was fed into the kiln at both the charge and discharge ends thereof, with 50% of this fuel being introduced through the charge end, and another 50% through the discharge end of the kiln. Decarbonization was effected at a temperature of 830° C., and lasted 0.6 sec. Introduced into the suspension of the decarbonized material was waste blast furnace slag as in Example 11, with the rate of introducing the said slag being 0.296 ton per ton of decarbonized material. A relative humidity of slag was 10%., acidity—1.06, average size of particles—8 mm. The temperature of burning the decarbonized material into cement clinker was 1,400° C. Specific consumption of heat constituted 680 kkal per 1 kg of the clinker produced.

The above examples show that the proposed method can be realized using various raw materials and fuels.

While the invention has been described herein in terms of specific embodiments, various modification may be made in the method and apparatus of the invention without departing from the spirit or the scope of the claims below.

What I claim is:

1. A method of manufacturing cement clinker comprising:
   (a) preheating finely divided cement raw material;
   (b) injecting said cement raw material by an air flow into a rotary kiln through a charge end thereof;
   (c) decarbonizing said cement raw material in suspension by a counterflow of combustion gases resulting from burning fuel at a discharge end of said kiln;
   (d) withdrawing thus decarbonized material by the peripheral portion of said gas flow through said charge end of said rotary kiln;
   (e) separating said decarbonized material from combustion gases;
   (f) delivering said separated decarbonized material back into said rotary kiln; and
   (g) burning said decarbonized material in a stirred bed within said rotary kiln.

2. A method as claimed in claim 1, wherein a finely divided cement raw material is preheated to a temperature ranging from 400 to 600° C. by the combustion gases separated from the decarbonized material.

3. A method as claimed in claim 1, wherein the preheated finely divided cement raw material is injected through the charge end of said kiln together with a portion of the fuel so that the decarbonization is effected in counterflows of combustion gases.

4. A method as claimed in claim 3, wherein from 20 to 80% by weight of fuel is burnt at the discharge end of said kiln with the rest of fuel being burned at the charge end thereof.

5. A method as claimed in claim 1, wherein into the suspension of the decarbonized material suspended in the combustion gases withdrawn from said kiln is introduced metallurgical slag, whereafter a solid phase of said suspension is separated and delivered back into said kiln for burning said solid phase in a stirred bed.

6. A method as claimed in claim 5, wherein said metallurgical slag is introduced into the decarbonized material in an amount from 0.02 to 1.35 ton per one ton of the decarbonized material per hour.

7. A method as claimed in claim 5, wherein the slag being introduced into the decarbonized material has a relative humidity from 1.5 to 12%, acidity from 0.2 to 1.4, and particle size from 0.5 to 40 mm.

8. An apparatus for manufacturing cement clinker, comprising:
   a rotary kiln having a charge end and a discharge end;
   an ejector coaxially introduced into said rotary kiln through said charge end;
   a cyclone heat exchange communicated with said ejector;
   a source of air communicated with said ejector;
   a separator connected with said charge end of said rotary kiln, adapted for separating the decarbonized material from the combustion gases, and having an inclined chute introduced into the charge end of said kiln; and
   an exhaust fan introduced into said rotary kiln through said charge end thereof.

9. An apparatus as claimed in claim 8, wherein said separator is communicated with said exhaust fan through said cyclone heat exchanger.

10. An apparatus, as claimed in claim 8, further includes a burner mounted within said ejector at said charge end of said kiln.

11. An apparatus as claimed in claim 8, wherein at an inlet of said separator there is installed a feed hopper for feeding metallurgical slag.

* * * * *